United States Patent
Taira et al.

(10) Patent No.: US 10,056,730 B2
(45) Date of Patent: Aug. 21, 2018

(54) SELECTIVE AMPLIFIER

(71) Applicant: INTER-UNIVERSITY RESEARCH INSTITUTE CORP. NATIONAL INSTITUTES OF NATURAL SCIENCES, Mitaka-shi, Tokyo (JP)

(72) Inventors: Takunori Taira, Okazaki (JP); Vincent Yahia, Okazaki (JP)

(73) Assignee: INTER-UNIVERSITY RESEARCH INSTITUTE CORPORATION NATIONAL INSTITUTES OF NATURAL SCIENCES, Mitaka (JP)

( * ) Notice: Subject to any disclaimer, the term of this patent is extended or adjusted under 35 U.S.C. 154(b) by 0 days.

(21) Appl. No.: 15/695,594

(22) Filed: Sep. 5, 2017

(65) Prior Publication Data

US 2018/0069368 A1    Mar. 8, 2018

(30) Foreign Application Priority Data

Sep. 7, 2016 (JP) ................................ 2016-174793

(51) Int. Cl.
*H01S 3/08* (2006.01)
*H01S 3/06* (2006.01)
*H01S 5/00* (2006.01)

(52) U.S. Cl.
CPC ........ *H01S 3/08018* (2013.01); *H01S 3/0602* (2013.01); *H01S 3/08059* (2013.01); *H01S 5/005* (2013.01)

(58) Field of Classification Search
CPC .. H01S 3/08018; H01S 3/0804; H01S 3/0602; H01S 3/0606; H01S 5/005
See application file for complete search history.

(56) References Cited

U.S. PATENT DOCUMENTS

| | | | | |
|---|---|---|---|---|
| 5,513,196 A | * | 4/1996 | Bischel | ................... H01S 5/141 372/102 |
| 5,818,630 A | | 10/1998 | Fermann et al. | |
| 2002/0018287 A1 | | 2/2002 | Zellmer et al. | |
| 2002/0034198 A1 | | 3/2002 | Masuda | |

(Continued)

FOREIGN PATENT DOCUMENTS

| | | |
|---|---|---|
| JP | H02-12980 A | 1/1990 |
| JP | H05-267750 A | 10/1993 |

(Continued)

OTHER PUBLICATIONS

Koecher et al., "Solid-state Lasers: A Graduate Text", pp. 91-92, Springer (2003).*

(Continued)

*Primary Examiner* — Eric L Bolda
(74) *Attorney, Agent, or Firm* — Oliff PLC

(57) ABSTRACT

Both of multi-mode laser beam 8A and excitation beam 34A for amplification are imputed to an amplification gain medium 62 in a relationship in which their optical axes match each other and an effective beam diameter of the excitation beam for amplification is smaller than an effective beam diameter of the multi-mode laser beam. As a result, laser beam of a part of modes progressing in a radiation range of the excitation beam 34A for amplification is selectively amplified. Laser beam 40A subjected to mode cleaning is thereby outputted.

6 Claims, 11 Drawing Sheets

(56) References Cited

U.S. PATENT DOCUMENTS

| | | | |
|---|---|---|---|
| 2002/0051479 A1* | 5/2002 | Fujikawa | H01S 3/0941 |
| | | | 372/70 |
| 2007/0280325 A1* | 12/2007 | Wang | H01S 3/2316 |
| | | | 372/72 |
| 2008/0089372 A1 | 4/2008 | Izawa et al. | |
| 2008/0267242 A1 | 10/2008 | Ershov et al. | |
| 2009/0080474 A1* | 3/2009 | Yamazoe | H01S 3/1118 |
| | | | 372/18 |
| 2009/0316746 A1 | 12/2009 | Nowak et al. | |

FOREIGN PATENT DOCUMENTS

| | | |
|---|---|---|
| JP | H11-074593 A | 3/1999 |
| JP | 2002-099007 A | 4/2002 |
| JP | 2002-141588 A | 5/2002 |
| JP | 2003-115627 A | 4/2003 |
| JP | 2004-286779 A | 10/2004 |
| JP | 2005-268506 A | 9/2005 |
| JP | 2006-186230 A | 7/2006 |
| JP | 2007-536572 A | 12/2007 |
| JP | 2010-021518 A | 1/2010 |
| JP | 2011-176358 A | 9/2011 |
| WO | 2005/109585 A2 | 11/2005 |

OTHER PUBLICATIONS

A. E. Siegman; "LASERS;" Chapter 17: Physical Properties of Gaussian Beams; University Science Books; 1986; p. 666.

Sep. 5, 2017 Office Action issued in Japanese Patent Application No. 2016-174793.

* cited by examiner

SELECTIVE AMPLIFIER

TECHNICAL FIELD

The description herein discloses a technique that amplifies laser beam of a part of modes included in a multi-mode laser beam.

BACKGROUND ART

A laser beam generator usually outputs a multi-mode laser beam including plural modes ranging from a low-order mode to a high-order mode. Depending on a purpose thereof, a laser beam having strong intensity at particular mode or modes may be required. For instance, a laser beam in which only a basic mode has strong intensity and higher-order modes have low intensity may be required. When the basic mode is dominant over other modes of a laser beam, designs and settings of an optical system that processes the laser beam can be simplified. Further, it becomes possible to increase light intensity per unit area by narrowing down a light condenser diameter. Various technical fields such as laser microfabrication processes, laser measurements, and optical communications require a laser beam in which only particular mode or modes of particular order range are dominant.

In order to obtain a basic mode-dominant laser beam from a multi-mode laser beam that includes plural modes ranging from a basic mode to higher-order modes, an iris is inserted on a propagation path of the laser beam to cut modes other than the basic mode. FIG. 1 explains this method. A semiconductor laser device 2 emits excitation beam 4, and an oscillation gain medium 6 is excited by the excitation beam 4 to output laser beam 8. Laser beam 8 includes laser beam 8a of a basic mode, and aside therefrom, it further includes laser beam 86b of a high-order mode of which order is two or more. The laser beam 8a in the basic mode emitted from the oscillation gain medium 6 progresses without hardly expanding, whereas the laser beam 8b in the high-order mode progresses while expanding. An iris 10 includes an aperture that allows the laser beam progressing without expanding to pass, and prohibits the laser beam progressing while expanding from passing. The laser beam 86b in the high-order mode progresses while expanding, and as such, it does not pass through the aperture. Laser beam 8c that had passed through the aperture is the laser beam of the basic mode, and the basic mode-dominant laser beam can be obtained. In the description herein, obtaining a laser beam in which a particular mode or modes of particular order range are dominant from a multi-mode laser beam including plural modes ranging from the basic mode to higher-order modes will be termed a mode cleaning. As shown in FIG. 1, cleaning for the basic mode can be performed by using the iris 10 provided with the aperture. However, according to this method, diffracted light 8d is undesirably generated around the laser beam 8c that had passed the aperture. Since diffracted light 8d cannot be cleaned, this procedure is not sufficient to "mode cleaning". Depictions given reference signs 12, 14, and 16 show light contrast patterns that are achieved by observing a lateral cross-sectional shape of the laser beam at their corresponding positions.

According to an optical system of FIG. 2, sufficient mode cleaning can be performed while suppressing generation of diffracted light. In the optical system of FIG. 2, a condenser lens 18 and a collimate lens 20 are added. The generation of the diffracted light can be avoided by using a combination of the condenser lens 18, the iris 10, and the collimate lens 20 to facilitate Fourier transform process (image relay). However, in this technique, air breakdown occurs at a light condensing point when strong laser beam is used. In order to prevent the air breakdown from occurring at the light condensing point with such high-intensity laser beam, the light condensing point needs to be situated in a vacuum environment, so a vacuum container 24 provided with windows 22, 26 becomes necessary. In the method of FIG. 2, even if the laser beam generator is made compact, the vacuum container 24 exceeding the size thereof becomes necessary in addition, so the advantage of compacting the laser beam generator cannot be enjoyed. Depictions given reference signs 12, 28 show the light contrast patterns that are achieved by observing the lateral cross-sectional shape of the laser beam at their corresponding positions, and a reference sign 30 shows the basic mode-dominant laser beam that has been subjected to mode cleaning.

U.S. Pat. No. 5,818,630 describes a technique that performs mode cleaning using a mode filter such as a fiber taper or a fiber coil. The technique of U.S. Pat. No. 5,818,630 requires special fibers such as the fiber taper or the fiber coil.

SUMMARY OF INVENTION

The description herein discloses a technique that performs mode cleaning without using an iris, Fourier transform optical system, vacuum container, or special fibers.

A selective amplifier disclosed in the description herein amplifies laser beam of a part of modes included in a multi-mode laser beam. The part of modes may be a single mode or plural modes of certain order range. This selective amplifier comprises an oscillation gain medium configured to generate the multi-mode laser beam, an amplification gain medium, and a generator configured to generate an excitation beam for amplification. The excitation beam for amplification is configured to exhibit an inverted distribution state when inputted to the amplification gain medium. Both of the multi-mode laser beam and the excitation beam for amplification are inputted to the amplification gain medium. At this occasion, a relationship is set in which an optical axis of the multi-mode laser beam and an optical axis of the excitation beam for amplification match each other. Further, an effective beam diameter of the excitation beam for amplification in the amplification gain medium is smaller than an effective beam diameter of the multi-mode laser beam in the amplification gain medium.

Laser beam of a part of modes included in the multi-mode laser beam progresses in a radiation range of the excitation beam for amplification, therefore, laser beam of the part of modes is effectively amplified. Laser beam of higher order modes included in the multi-mode laser beam progresses outside of the radiation range of the excitation beam for amplification, therefor, laser beam of higher order modes is hardly amplified. The selective amplification is achieved.

The effective beam diameter described herein refers to a beam diameter in which 99% optical power of the beam is included within the diameter. When the excitation beam for amplification is a laser beam of a high-order mode, the effective beam diameter of the excitation beam for amplification is substantially equal to a $1/e^2$ beam diameter. As to laser beam of the basic mode included in the multi-mode laser beam, the effective beam diameter of the basic mode laser beam becomes $\pi \times 1/e^2$ beam diameter (see p. 666 of LASERS, A. E. Siegman, University Science Books, 1986). When $1/e^2$ beam diameter of the excitation beam for amplification is smaller than $\pi \times 1/e^2$ beam diameter of the basic mode laser beam, a laser beam having amplified intensity at the basic mode is outputted from the amplification gain medium. By selecting $1/e^2$ beam diameter of the excitation beam for amplification, a part of modes to be amplified can be selected.

The oscillation gain medium and the amplification gain medium may be separate members, but may be an integral member. A part of a gain medium may be used as the oscillation gain medium and another part thereof may be used as the amplification gain medium. In this case, the oscillation gain medium and the amplification gain medium are integrated.

The optical axis of the multi-mode laser beam and the optical axis of the excitation beam for amplification need to be matching, however, progressing directions thereof may be in a same direction, or may be opposite directions. For example, a relationship may be given in which the amplification gain medium may be provided with a pair of parallel end faces, and the multi-mode laser beam may be inputted to the amplification gain medium from one end face, and the excitation beam for amplification may be inputted to the amplification gain medium from the other end face.

The multi-mode laser beam may progress through the amplification gain medium in a one-way manner, or may progress in a round trip manner therein. The excitation beam for amplification may also progress through the amplification gain medium in a one-way manner, may progress in a round trip manner, or may reciprocate plural times therein. The excitation beam for amplification may be emitted from the aforementioned one end face, or may be emitted from the aforementioned other end face. An optical system that returns the excitation beam for amplification, which had been emitted from the amplification gain medium, back to the amplification gain medium again may further be provided.

The amplified laser beam may be emitted from the aforementioned other end face, or may be emitted from the aforementioned one end face.

If the effective beam diameter of the excitation beam for amplification in the amplification gain medium is equal to or less than an effective beam diameter of the laser beam in the basic mode, a laser beam that selectively amplified the basic mode can be outputted.

When the effective beam diameter of the excitation beam for amplification in the amplification gain medium is smaller than an effective beam diameter of the multi-mode laser beam in the amplification gain medium, laser beam of a part of modes included in the multi-mode laser beam is amplified. Lower order mode or modes having the effective beam diameter equal to or smaller than the effective beam diameter of the excitation beam for amplification are selectively amplified.

For example, there may be a case where only laser beam having an order $TEM_{nm}$ (here, n and m start from 0. A mode with larger values of n, m is a higher-order mode) needs to be amplified. In this case, the laser beam having the order (n, m) can be selected and amplified by configuring a beam space distribution of the laser beam in the (n, m)-order mode in the amplification gain medium and a beam space distribution of the excitation beam for amplification in the amplification gain medium to overlap with each other. For example, since a $TEM_{00}$ mode becomes a basic Gaussian mode (hereafter "basic mode"), it can be amplified by excitation beam for amplification having a bright center and a circular lateral cross-sectional shape. In a $TEM_{01}$ mode, it has a beam space distribution with a lateral cross section in an annular shape. In this case, it can be amplified by excitation beam for amplification having an annular lateral cross-sectional shape.

Contrast between a necessary order mode and unnecessary order modes can be increased by amplifying the necessary order mode and not amplifying the unnecessary order modes. This is equivalent to having cleaned the laser beam. Mode-cleaned laser beam can be achieved by selectively amplifying a specific mode of the laser beam in which plural modes are mixed. That is, in order to obtain $TEM_{00}$ mode-dominant laser beam from the multi-mode laser beam, a center of the multi-mode laser beam can be selectively amplified. In order to obtain $TEM_{01}$ mode-dominant laser beam from the multi-mode laser beam, the multi-mode laser beam may be excited by annular excitation beam for amplification.

Materials and compositions of the oscillation gain medium and the amplification gain medium are not particularly limited, so long as they exhibit an inverted distribution state and an induced emission phenomenon. For example, they may be solids such as monocrystal or polycrystalline ceramic. Use of a solid gain medium can simplify the device configuration. Further, same effect can be expected by optical parametric light amplification using nonlinear optical medium.

According to the technique disclosed in the description herein, specific mode or modes dominant laser beam can be achieved, and a quality of the laser beam can be improved. For example, power per unit area of the laser beam is increased in various applications such as laser processing devices, laser ignition devices for engines, terahertz wave generators, nonlinear wavelength modulating devices for high frequency wave generation and parametric generation, measurement devices, or medical apparatuses. Alternatively, information capacity available for optical communication can be increased.

DETAILED DESCRIPTION

Figure 1:
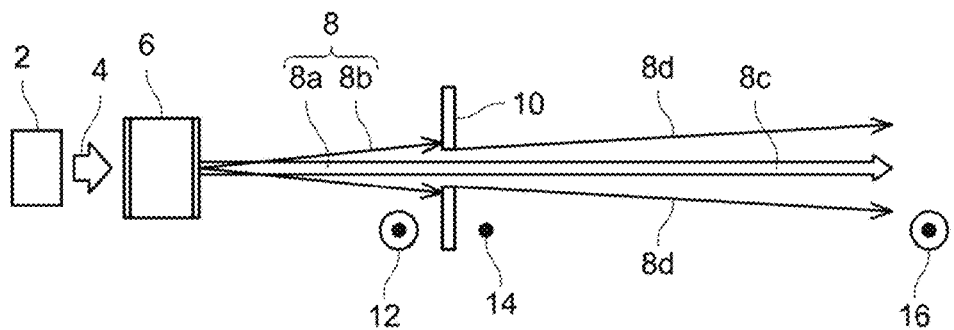
FIG. 1 explains a conventional device for selecting a basic mode.
Figure 2:
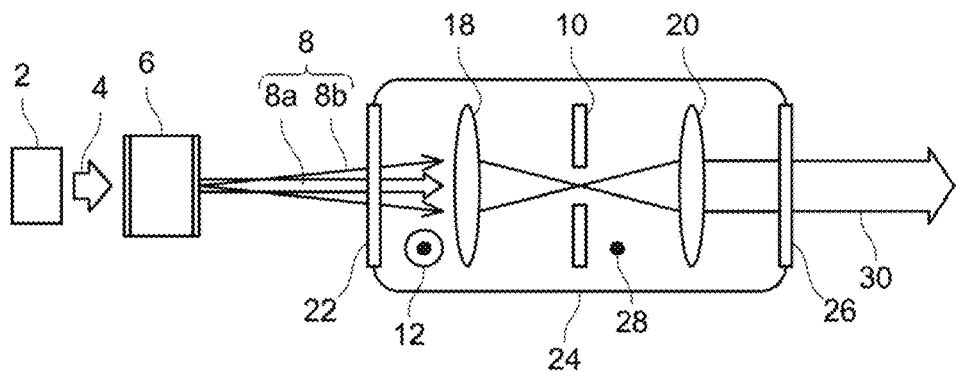
FIG. 2 explains another conventional device for selecting the basic mode.

Some features of embodiments described below will be listed.

(Feature 1) Multi-mode laser beam may progress (pass) in a one-way manner through an amplification gain medium.

(Feature 2) The multi-mode laser beam may progress in a round trip manner through the amplification gain medium.

(Feature 3) Excitation beam for amplification may progress (pass) in a one-way manner through an amplification gain medium.

(Feature 4) The excitation beam for amplification may progress in a round trip manner through the amplification gain medium.

(Feature 5) The multi-mode laser beam and the excitation beam for amplification may be inputted to the amplification gain medium from a same surface.

(Feature 6) The multi-mode laser beam and the excitation beam for amplification may be inputted to the amplification gain medium from opposite surfaces.

(Feature 7) According to definitions, a beam radius w and a beam diameter 2×w of the laser beam are defined as second moments in a light intensity special distribution. Thus, the beam radius of the laser beam in the basic mode becomes w when a light intensity at a position separated from an optical axis in a radial direction by a distance w exhibits $1/e^2$ with respect to a light intensity of this basic mode laser beam on the optical axis. In this case, w is called as $1/e^2$ radius, effective beam radius is equal to $1/e^2$ radius, and effective beam diameter is equal to $1/e^2$ diameter.

However, in a case of a basic Gaussian mode, a light intensity distribution of the laser beam does not immediately become zero even in ranges exceeding beyond $1/e^2$ radius from the optical axis, and instead it exhibits a Gaussian distribution. For example, when the basic mode laser beam is passed through a pin hole with a diameter of 2×w, not a small portion of its components will be lost. A diameter of an aperture required for obtaining 99% optical power becomes π×w (see p. 666 of LASERS, A. E. Siegman, University Science Books, 1986). In the laser beam of Gaussian mode, effective beam diameter is equal to π×w (π×$1/e^2$ diameter).

In laser beam amplification, light with a higher order mode (which may in other words be said as having coarse beam quality) may be used to amplify a specific mode to achieve a high-quality laser beam. That is, laser beam of higher-order modes may be used as the excitation beam for amplification. In cases with the light of high-order modes, its boundary of intensity distribution exhibits a rapid change, and as such, the light intensity thereof drops dramatically instead of exhibiting a slope as in the basic mode at the $1/e^2$ radius by complying with the second moment definition (see C21 or C22 in FIG. 12).

From the above observations, an effective beam diameter of the basic mode laser beam as described herein refers to a diameter (π×w) including 99% of a basic mode component. With respect to this, an effective beam diameter of the excitation beam for amplification is substantially equal to the $1/e^2$ diameter. When the effective beam diameter ($1/e^2$ diameter) of the excitation beam for amplification is equal to 2.15×w (w=$1/e^2$ diameter of the basic mode laser beam), the effective beam diameter (2.15×w) of the excitation beam for amplification is smaller than the effective beam diameter (3.14×w) of the basic mode laser beam, as a result of which the basic mode is selectively amplified.

(Feature 8) The effective beam diameter of the excitation beam for amplification may be set to 2.3×w (w=$1/e^2$ diameter of the basic mode laser beam) or less. Substantially same contrast as for the case of Feature 7 can thereby be achieved.

(Feature 9) The effective beam diameter of the excitation beam for amplification may be set to 1.43×w (w=$1/e^2$ diameter of the basic mode laser beam). The effective beam diameter (1.43×w) of the excitation beam for amplification is smaller than the effective beam diameter (3.14×w) of the basic mode laser beam, as a result of which the basic mode is selectively amplified.

(Feature 10) The effective beam diameter of the excitation beam for amplification may be set to 1.57×w (w=$1/e^2$ diameter of the basic mode laser beam) or less with respect to the effective beam diameter (3.14×w) of the basic mode laser beam. Substantially same contrast as for the case of Feature 9 can thereby be achieved.

(Feature 11) Pulsed multi-mode laser beam may be inputted to the amplification gain medium in a state where the amplification gain medium is excited using the pulsed excitation beam for amplification.

(Feature 12) An amplification gain may be 2 or more.

Embodiments (Selective Amplifier of Embodiment 1)

Figure 3A:
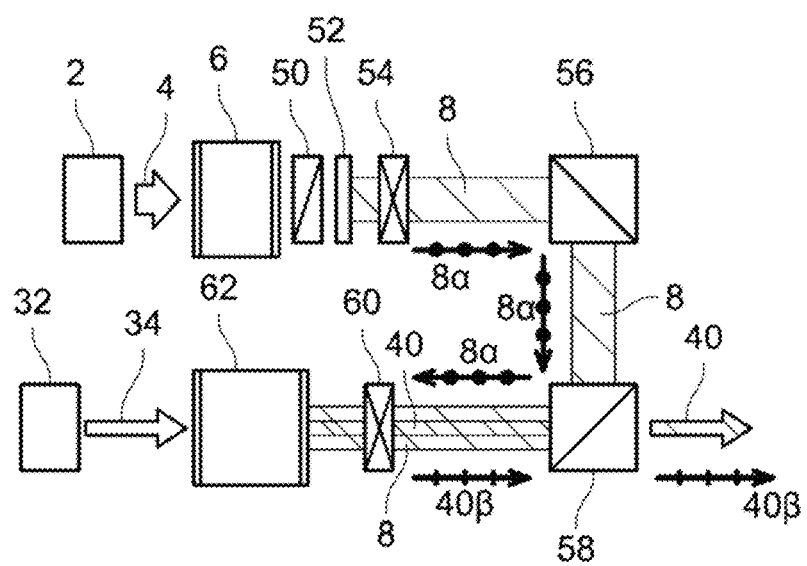
FIGS. 3(a) and 3(b) explain selective amplifiers of an embodiment 1.
Figure 3B:
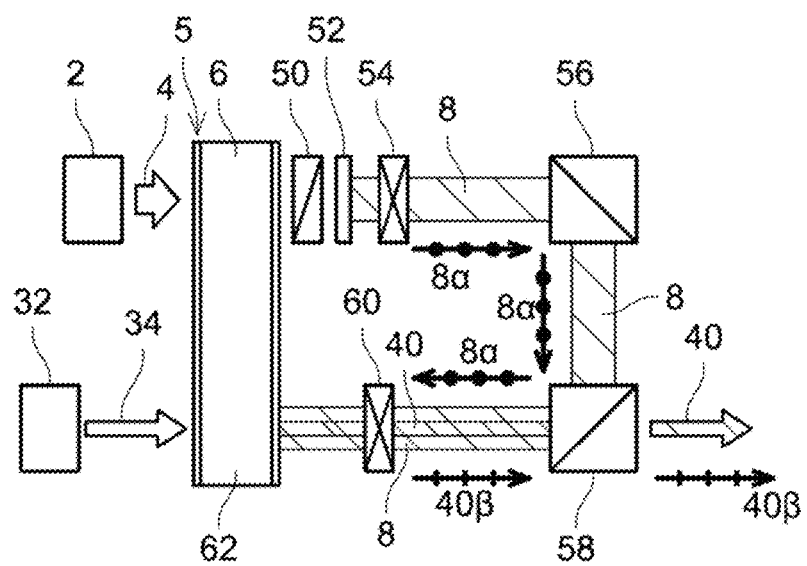

In FIGS. 3(a) and 3(b), a reference sign 2 is a semiconductor laser device configured to emit excitation beam 4 for oscillation. A reference sign 6 is an oscillation gain medium configured to emit multi-mode laser beam 8 when the excitation beam 4 for oscillation is inputted and excited (having an inverted distribution state developed therein).

A left end face of the oscillation gain medium 6 is coated by a film that does not reflect the excitation beam 4 for oscillation but reflects the laser beam 8. A reference sign 52 is a mirror configured to reflect the excitation beam 4 for oscillation and reflects a part of the laser beam 8 but not another part of the laser beam 8. A laser oscillating system is configured by the left end face of the oscillation gain medium 6 and the mirror 52. The laser beam 8 progresses to the right from the mirror 52. The laser beam 8 is a multi-mode laser beam. A PBS (Polarized Beam Splitter) 50 is inserted in the laser oscillating system, and the multi-mode laser beam 8 progressing to the right from a λ/2 plate 54 is linearly polarized. A sign shown by 8a shows that a polarization plane is vertical to a sheet surface. A right end face of the oscillation gain medium 6 is coated by a film that does not reflect both the excitation beam 4 for oscillation and the laser beam 8, and the PBS 50 is constituted of a material that does not reflect both the excitation beam 4 for oscillation and the laser beam 8. The right end face of the oscillation gain medium 6 may be coated by a film that reflects the excitation beam 4 for oscillation but not the laser beam 8, in which case there will be no limitation to reflection performance of the PBS 50 and the mirror 52 regarding the excitation beam 4 for oscillation.

A PBS 56 and a PBS 58 reflect the laser beam 8, of which polarization plane is vertical to the sheet surface. The laser beam 8 passes through a λ/4 plate 60, and is inputted to an amplification gain medium 62.

A reference sign 32 is a semiconductor laser device configured to emit excitation beam 34 for amplification, and the excitation beam 34 for amplification is inputted to the amplification gain medium 62. The laser beam 8 and the excitation beam 34 for amplification are inputted to the amplification gain medium 62 from opposite end faces in a state of having their optical axes matching each other.

A left end face of the amplification gain medium 62 is coated by a film configured not to reflect the excitation beam 34 for amplification but to reflect the laser beam 8, and a right end face thereof is coated by a film configured to reflect the excitation beam 34 for amplification but not the laser beam 8. The laser beam 8 progresses within the amplification gain medium 62 in a return trip manner by being reflected on the left end face of the amplification gain medium 62, and the excitation beam 34 for amplification progresses within the amplification gain medium 62 in a return trip manner by being reflected on the right end face of the amplification gain medium 62. When the laser beam 8 progresses in the return trip manner within the amplification gain medium 62, the excitation beam 34 for amplification also progresses in the return trip manner. A high amplification gain can thereby be achieved.

A relationship of an effective beam diameter of the basic mode laser beam 8 in the amplification gain medium 62 (the former) and an effective beam diameter of the excitation beam 34 for amplification in the amplification gain medium 62 (the latter) is that the former is larger than the latter, as will be described later with reference to FIG. 12. As the multi-mode laser beam 8 progresses within the amplification gain medium 62, a basic mode included in the multi-mode laser beam 8 is selectively amplified. Laser beam 40 of the basic mode as amplified progresses to the right from the right end face of the amplification gain medium 62. The laser beam 8 and the laser beam 40 pass through the λ/4 plate 60 twice in total, and as such, the laser beam 40 progressing to the right from the λ/4 plate 60 has its polarization plane rotated by 90°. A sign shown by 400 indicates that the polarization plane is parallel to the sheet surface. The laser beam 40 (40β) having the polarization plane parallel to the sheet surface progresses straight without being reflected by the PBS 58. The laser beam 40 (40β) progressing to the right from the PBS 58 is laser beam in which the basic mode included in the multi-mode laser beam 8 has been selectively amplified. The device shown in each of FIGS. 3(*a*) and 3(*b*) outputs the laser beam 40 (40β) that selectively amplified only the basic mode included in the multi-mode laser beam 8.

As shown in FIG. 3(*b*), a part of a gain medium 5 may be used as the oscillation gain medium 6, and another part thereof may be used as the amplification gain medium 62. That is, the oscillation gain medium 6 and the amplification gain medium 62 may be integrated.

(Embodiment 2)

Figure 4A:
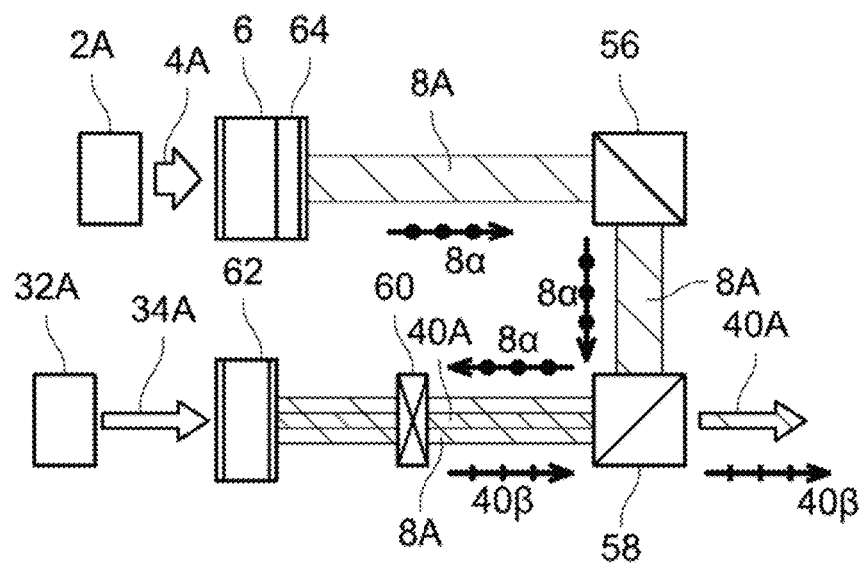
FIGS. 4(a) and 4(b) explain selective amplifiers of an embodiment 2.
Figure 4B:
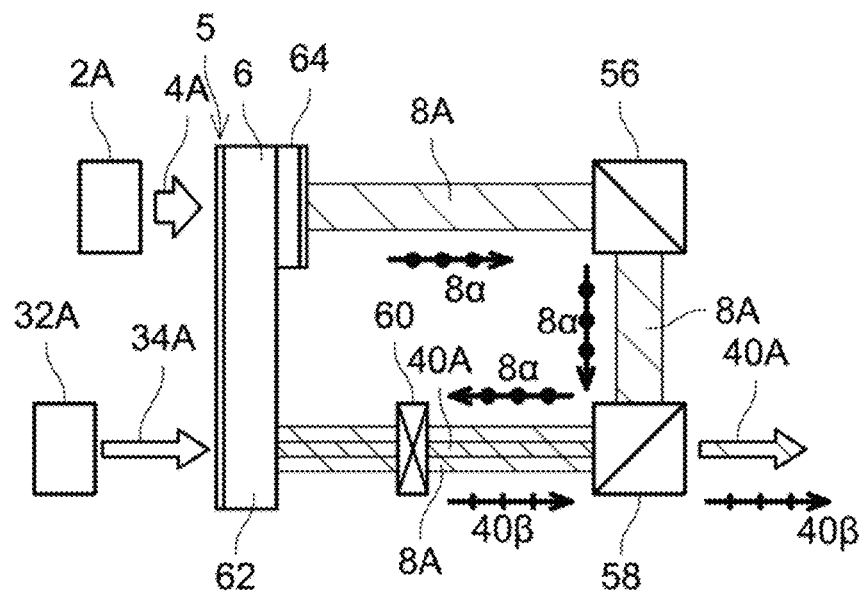

Selective amplifiers of an embodiment 2 shown in FIGS. 4(*a*) and 4(*b*) each have a saturable absorber 64 configured to function as a Q switch inserted in a laser oscillating system configured of the left end face of the oscillation gain medium 6 and a mirror, and pulsed laser beam 8A is emitted from a right end face of the saturable absorber 64. In this embodiment, a film corresponding to the mirror 52 in FIGS. 3(*a*) and 3(*b*) is coated on the right end face of the saturable absorber 64. Members of which explanation has already been given will be given same reference signs, and duplicated explanation thereof will be omitted.

A semiconductor laser device 32A is driven by pulsed voltage, and generates pulsed excitation beam 34A for amplification. The pulsed excitation beam 34A for amplification is inputted to the amplification gain medium 62. A pulse width (duration) of pulsed laser beam 8A is short as compared to a pulse width (duration) of the pulsed excitation beam 34A for amplification. Further, a time period from an excitation starting time by the pulsed excitation beam 34A for amplification until when transmittance of the saturable absorber 64 drops can be controlled. The excitation is started by the pulsed excitation beam 34A for amplification, by which the inverted distribution state is generated in the amplification gain medium 62, then the pulsed laser beam 8A is inputted in a state of exhibiting the inverted distribution state to cause inductive emission for achieving amplification. A stronger inverted distribution state is developed with longer time difference between an excitation starting time of the pulsed excitation beam 34A for amplification and an input time of the pulsed laser beam 8A, and a gain of the amplification becomes higher. The gain herein refers to a value obtained by dividing energy of the amplified laser beam by energy of the basic mode laser beam before the amplification. An added letter "A" shown in FIGS. 4(*a*) and 4(*b*) indicates that the beam is pulsed.

In this embodiment, the gain is measured while changing the time difference between the excitation starting time of the pulsed excitation beam 34A for amplification and the input time of the pulsed laser beam 8A. To do so, the saturable absorber 64 of which transmittance drops by external stimulation is used. That is, an active Q switch is used. Upon practical implementation, a saturable absorber 64 that operates as a passive Q switch may alternatively be used.

As shown in FIG. 4(*b*), in this embodiment as well, a part of the gain medium 5 may be used as the oscillation gain medium 6, and another part thereof may be used as the amplification gain medium 62. That is, the oscillation gain medium 6 and the amplification gain medium 62 may be integrated.

An experiment result obtained by using the embodiments shown in FIGS. 4(*a*) and 4(*b*) will be presented below.

Figure 12:
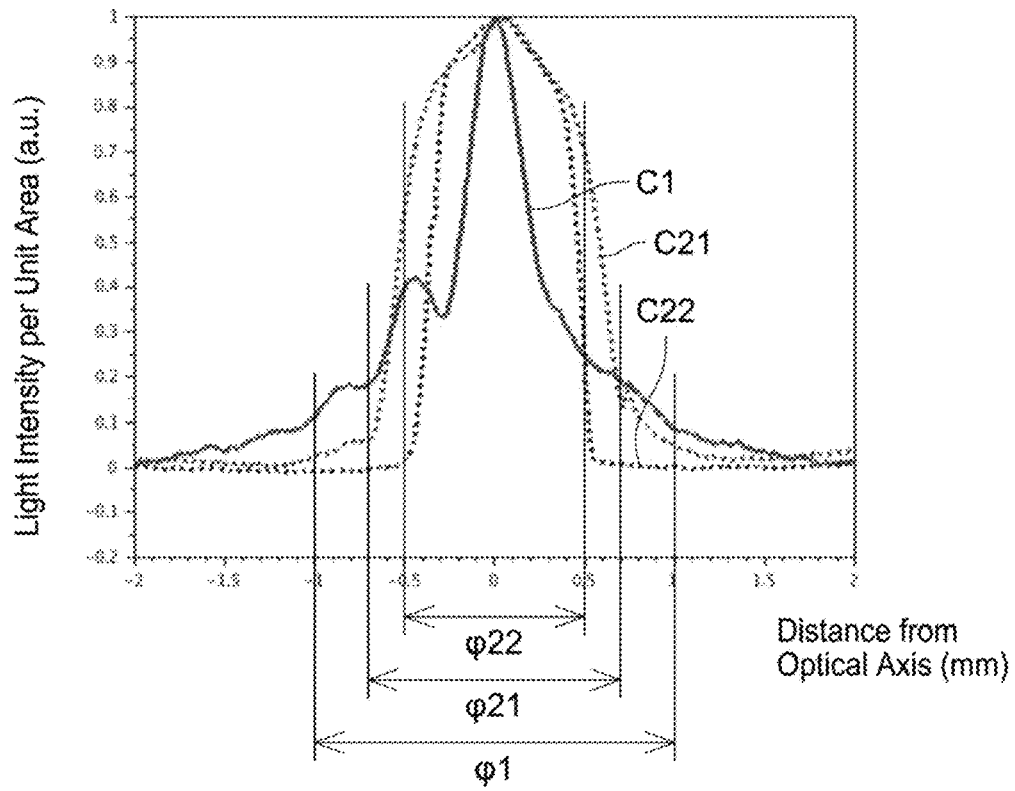
FIG. 12 shows a relationship of multi-mode laser beam and excitation beam for amplification regarding their distances from an optical axis and their intensities.

A curve C1 in FIG. 12 shows a beam profile of the laser beam 8 progressing in the amplification gain medium 62, where a horizontal axis is a distance from the optical axis, and a vertical axis is its light intensity per unit area. A light intensity per unit area standardizes a value on the optical axis by 1.00. A diameter φ1 shown in the drawing is a diameter in which 99% of the basic mode component is to be included within, which in these embodiments was 2040 μm.

There may be plural types of methods for defining the beam diameter. Measurement of the $1/e^2$ radius is recommended by the ISO for the basic Gaussian beam, and the technical field considers this as its standard. The $1/e^2$ radius is a distance of a location from the optical axis of the laser beam where the light intensity per unit area at that location becomes $1/e^2$ of the light intensity per unit area on the optical axis. In the present embodiments, the $1/e^2$ radius was 650 μm. The basic mode component is distributed to outside of the $1/e^2$ radius, and the radius including 99% of the basic mode component is larger than the $1/e^2$ radius. An effective beam diameter φ1 including 99% of the basic mode component is given a relationship of $\pi \times (1/e^2 \text{ radius})$. In the present embodiments, the $1/e^2$ radius is firstly measured, and then the effective beam diameter (φ1) of the basic mode is obtained. The presence of the relationship of $\varphi1 = \pi \times (1/e^2 \text{ radius})$ is described in LASERS, A. E. Siegman, University Science Books, 1986.

A curve C21 in FIG. 12 shows a beam profile of first excitation beam for amplification used in a first experiment. In this experiment, an optical fiber having 900-micron diameter is used between the semiconductor laser device 32 that emits the excitation beam 34 for amplification and the amplification gain medium 62, and the excitation beam 34 for amplification guided by the optical fiber is inputted to the amplification gain medium 62 through a magnifying optical system. The beam profile as guided by the optical fiber does not exhibit a Gaussian distribution, but attenuates rapidly at a position away from the optical axis by a predetermined distance. A diameter φ21 including 99% of the excitation beam 34 for amplification was 1400 µm. That is, whereas the effective beam diameter of the basic mode laser beam is π×w, an effective beam diameter of the excitation beam for amplification was defined as 2.15×w.

The effective beam diameter φ21 (1400 µm) of the excitation beam 34 for amplification used in the experiment is narrower than the effective beam diameter φ1 (2040 µm) of the basic mode laser beam. In this case, laser beam within the basic mode laser beam existing within the effective beam diameter φ21 of the excitation beam 34 for amplification is selectively amplified.

In a second experiment to be described later, an optical fiber with 600-micron diameter is used between the semiconductor laser device 32 and the amplification gain medium 62, and the excitation beam 34 for amplification guided by this optical fiber is inputted to the amplification gain medium 62 through the magnifying optical system. A curve C22 in FIG. 12 shows a beam profile of second excitation beam for amplification used in the second experiment. A diameter φ22 including 99% of the excitation beam 34 for amplification was 930 µm. That is, whereas the effective beam diameter of the basic mode laser beam is π×w, an effective beam diameter of the excitation beam for amplification was defined as 1.43×w. The effective beam diameter φ22 (930 µm) of the excitation beam 34 for amplification used in the second experiment is narrower than the effective beam diameter φ1 (2040 µm) of the basic mode laser beam. Due to this, laser beam within the basic mode laser beam existing within the effective beam diameter φ22 of the excitation beam 34 for amplification is selectively amplified.

Figure 13:
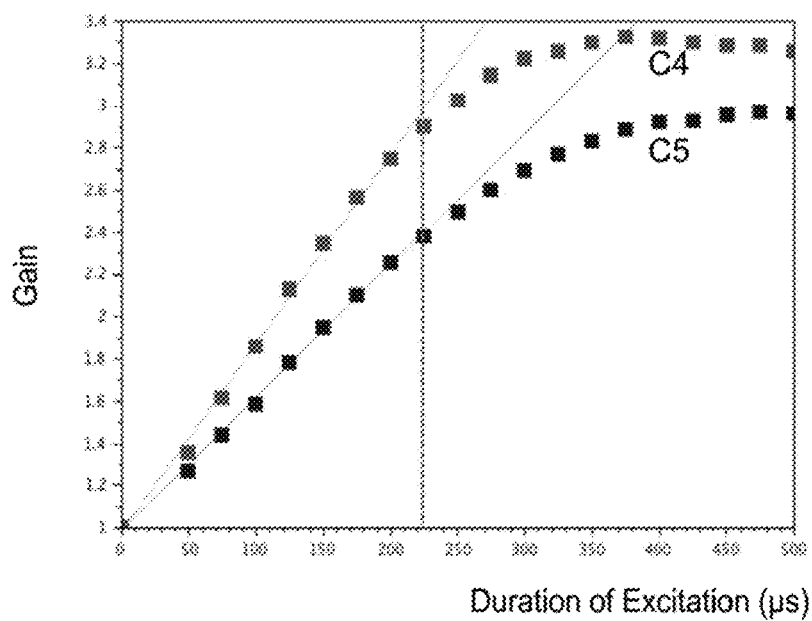
FIG. 13 shows a relationship of duration of the excitation beam for amplification and a gain thereof.

FIG. 13 shows a relationship between the gain and the time difference (excitation duration) between the excitation starting time of the pulsed excitation beam 34A for amplification and the input time of the pulsed laser beam 8A. A curve C4 shows a measurement result for a case where the diameter φ22 of the excitation beam 34 for amplification is 930 µm, and a curve C5 shows a measurement result for a case where the diameter φ21 of the excitation beam 34 for amplification is 1400 µm. Since the case of φ22=930 µm (curve C4) apparently has a higher light intensity per unit area than the case of φ21=1400 µm (curve C5), the gain thereof is also higher. As apparent from the curves C4, C5, the gain increases with longer excitation duration. The inverted distribution state develops during the excitation duration. When the excitation duration reaches a high-level life period, the inverted distribution state develops no further, and the gain is thereby saturated.

Figure 14:
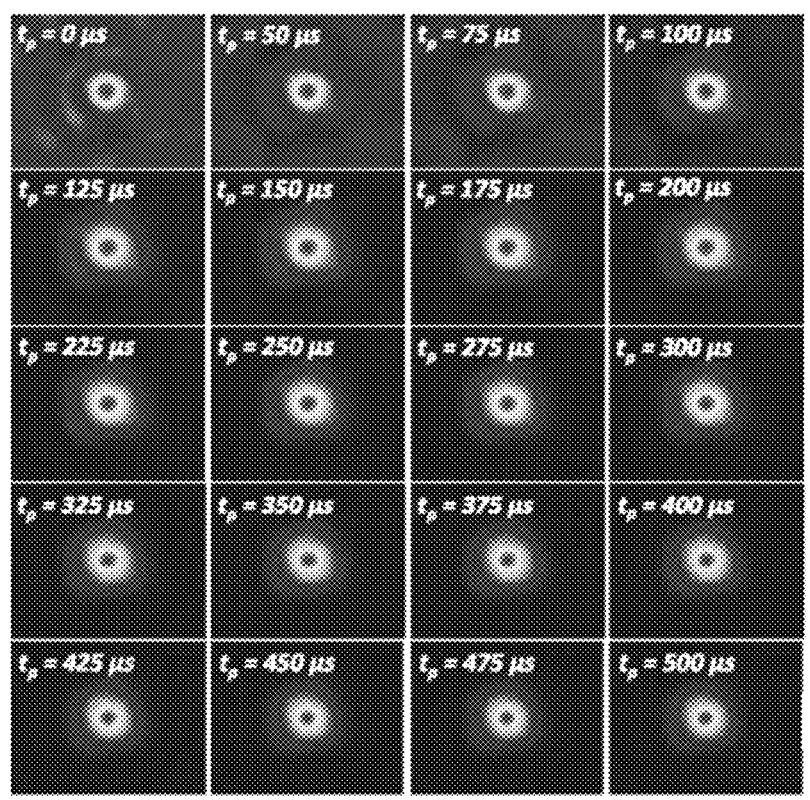
FIG. 14 shows the duration of the excitation beam for amplification and beam profiles after selective amplification.

FIG. 14 shows a result of capturing a lateral cross-sectional shape of the amplified laser beam 40A by a CCD camera after the selective amplification has been performed using the excitation beam 34 for amplification with the diameter φ21 of 1400 µm. $t_p$ in the drawing indicates the time difference between the excitation starting time of the pulsed excitation beam 34A for amplification and the input time of the pulsed laser beam 8A (that is, duration of excitation). Longer excitation duration $t_p$ brings forth greater gain.

Figure 15A:
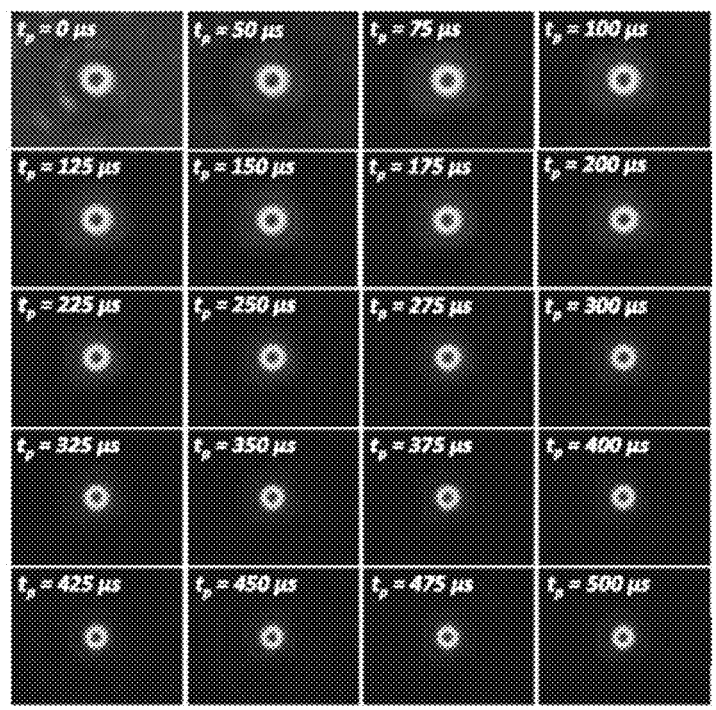
FIGS. 15(a) to 15(c) show the duration of the excitation beam for amplification and the beam profiles after the selective amplification.
Figure 15B:
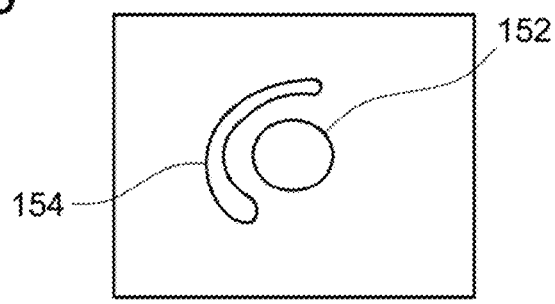
Figure 15C:
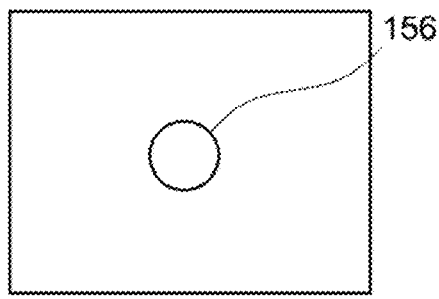

FIG. 15(a) shows a result of capturing the lateral cross-sectional shape of the amplified laser beam 40A by the CCD camera after the selective amplification has been performed using the excitation beam 34 for amplification with the diameter φ22 of 930 µm. FIG. 15(b) shows a lateral cross-sectional shape of the multi-mode laser beam 8A when $t_p$ is zero (that is, before the amplification), and a high-order mode laser beam 154 exists around a high-intensity region 152 at a center. FIG. 15(c) shows a lateral cross-sectional shape of the amplified laser beam 40A when $t_p$ is 500 µsec (with 3.2 times gain, according to FIG. 13). The radiation area 154 of the high-order mode that had existed in FIG. 15(b) is gone, and from this, it can be understood that cleaning of the high-order modes has been carried out. Further, a size of a high-intensity region 156 at the center has become smaller than 152 in FIG. 15(b). This corresponds to the fact that high-order mode component that was included in an outskirt of the curve C1 of FIG. 12 has been cleaned. As apparent from FIGS. 15(b), 15(c), the mode cleaning is enhanced by the selective amplification. Further, it can also be understood from changes in the $t_p$ in FIG. 14 and FIG. 15(a) that the mode cleaning progresses more efficiently with greater gain for the amplification. Further, from FIG. 13 and a comparison of FIG. 14 and FIG. 15(a), it can be understood that the mode cleaning progresses more efficiently with narrower effective beam diameter for the excitation beam for amplification. In order to selectively extract only the basic mode, it is advantageous to narrow down the effective beam diameter of the excitation beam 34 for amplification and increase the gain.

Figure 16A:
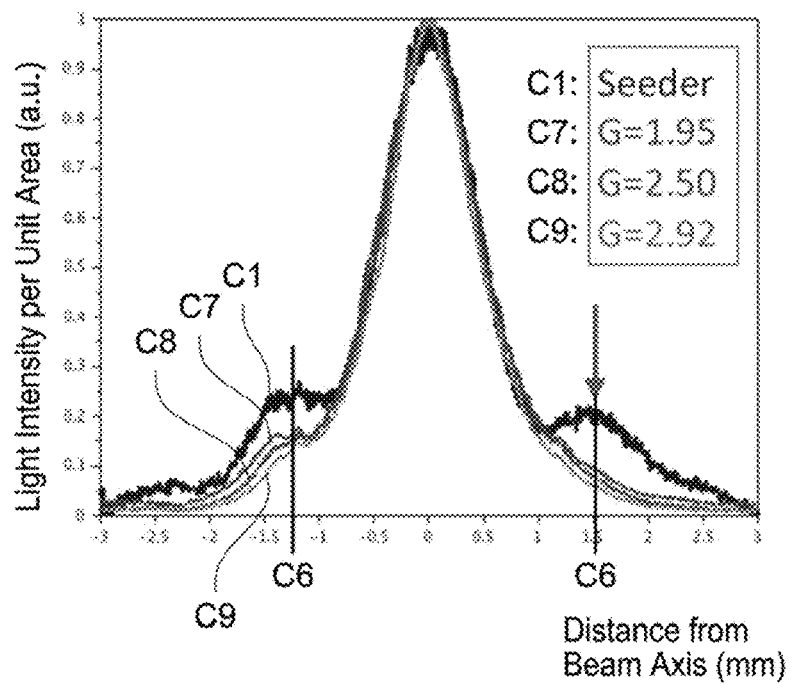
FIGS. 16(A) and 16(B) show the beam profiles before and after the selective amplification.
Figure 16B:
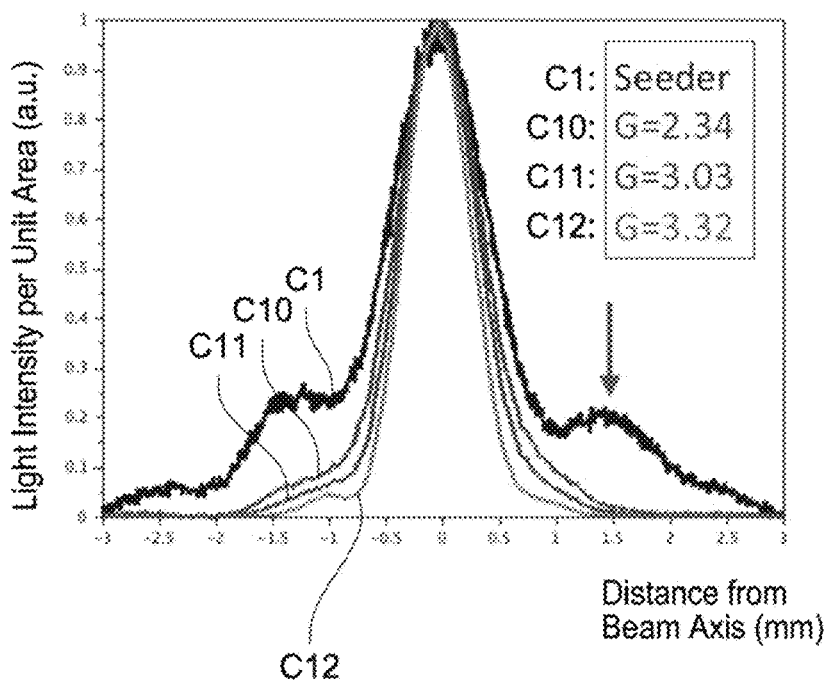

FIGS. 16(A) and 16(B) show the beam profiles of the laser beam before and after the amplification. FIG. 16(A) shows cases for the diameter φ21 of the excitation beam 34 for amplification being 1400 µm, and FIG. 16(B) shows cases for the diameter φ22 of the excitation beam 34 for amplification being 930 µm. A curve C1 shows the beam profile of the laser beam 8 before the selective amplification, and is equal to the curve C1 in FIG. 12. C7 to C9 and C10 to C12 show the beam profiles of the laser beam 40A after the selective amplification. The amplifying gain is different among C7 to C9 and C10 to C12. By the selective amplification, curves at the outskirts transform into curves that attenuate as the distance from the beam axis increases. The outskirts curve of C1 does not smoothly attenuate as the distance increases, on the other hand, the outskirts curves of C7 to C9 and C10 to C12 smoothly attenuate as the distance increases. This corresponds to the high intensity region 152 contracting to 156 in FIGS. 15(b) and 15(c). This change becomes more prominent with narrower effective beam diameter of the excitation beam for amplification and with greater gain.

The contrast was measured from the graph of FIGS. 16(A) and 16(B). The contrast was defined as "intensity per unit area of the laser beam before the selective amplification/intensity per unit area of the laser beam after the selective amplification" at a position where a first peak other than the optical axis appears (a position of C6) in the beam profile C1 of the laser beam before the selective amplification. In the graph of FIG. 16(A), the contrast increased from 5 to 16.7 by increasing the gain from 1.95 to 2.92. For the case where the effective beam diameter of the excitation beam for amplification is set to 2.15×w with respect to the effective beam diameter (π×w) of the basic mode laser beam, the contrast becomes clear by setting the gain to be equal to or greater than 2. For a case of setting the effective beam diameter of the excitation beam for amplification to 2.3×w as well, the contrast was clarified by setting the gain to be equal to or greater than 2.

In the graph of FIG. 16(B), the contrast increased from 5 to 250 by increasing the gain from 2.34 to 3.32. For the case where the effective beam diameter of the excitation beam for amplification is set to 1.43×w with respect to the effective beam diameter (π×w) of the basic mode laser beam, the contrast becomes significantly clear by setting the gain to be equal to or greater than 2. For a case of setting the effective beam diameter of the excitation beam for amplification to 1.57×w as well, the contrast was significantly clarified by setting the gain to be equal to or greater than 2.

Figure 17:
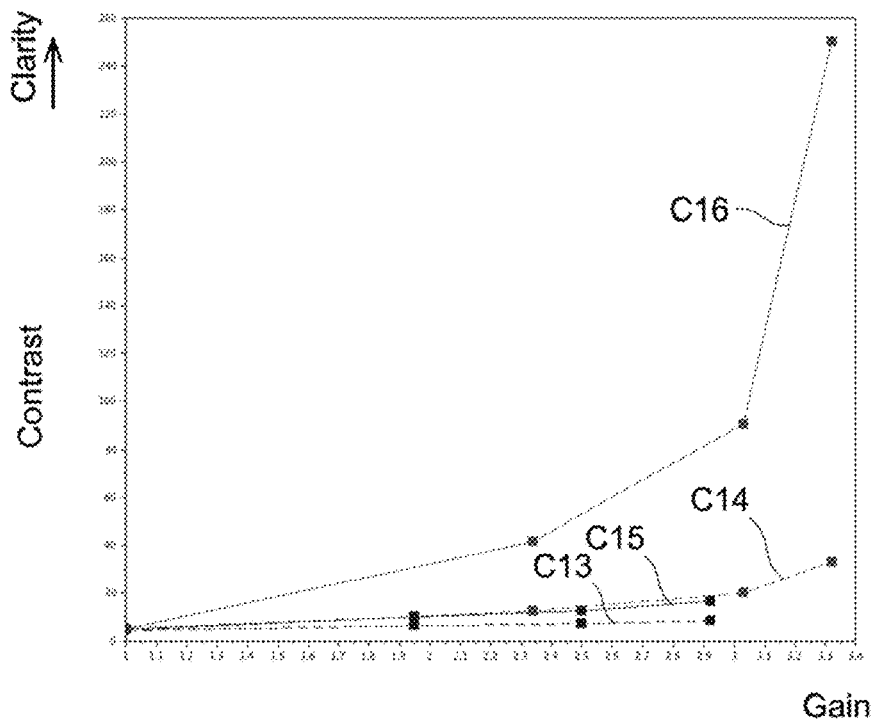
FIG. 17 shows a relationship of the gain and a contrast.

FIG. 17 shows a relationship of the gain and the contrast. A vertical axis of FIG. 17 indicates the contrast as previously presented, and means that the contrast is clearer towards its upper side. Since beam used in the experiment is not necessarily bilaterally symmetric, measurements were carried out for both left and right sides of the optical axis. A curve C16 shows a right-side contrast obtained by the excitation beam for amplification of 930 μm, and this contrast becomes clearer accompanying the increase in the gain. A curve C14 shows a left-side contrast obtained by the excitation beam for amplification of 930 μm, and this contrast becomes clearer accompanying the increase in the gain. A curve C15 shows a right-side contrast obtained by the excitation beam for amplification of 1400 μm, and this contrast becomes clearer accompanying the increase in the gain. A curve C13 shows a left-side contrast obtained by the excitation beam for amplification of 1400 μm, and this contrast becomes clearer accompanying the increase in the gain. As a result of comparing C15 and C16 and comparing C13 and C14, apparently the contrast becomes clearer with narrower diameter of the excitation beam for amplification under the same gain.

Figure 18:
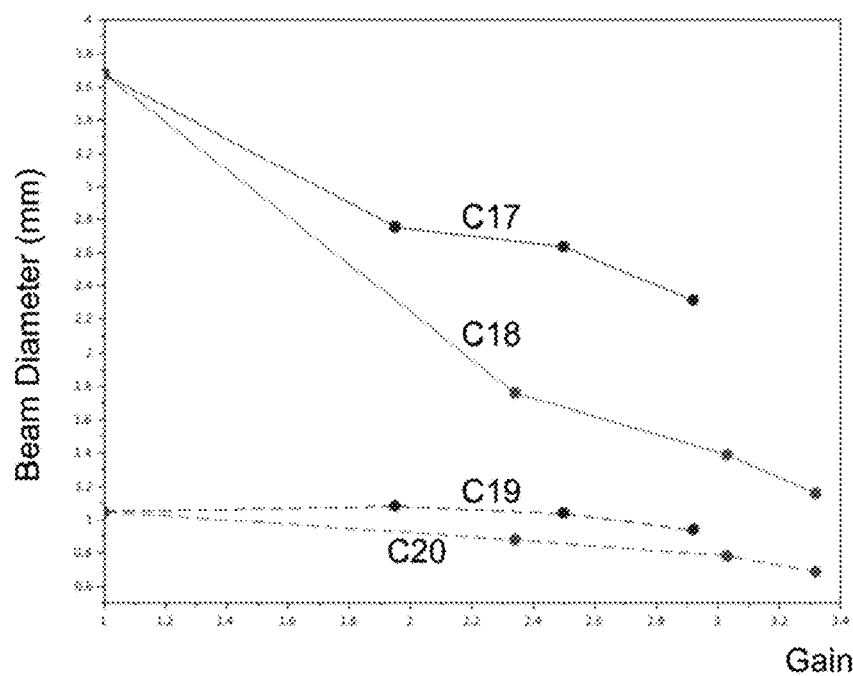
FIG. 18 shows a relationship of the gain and a beam diameter of selectively amplified laser beam.

FIG. 18 shows the diameter of the laser beam 40A after the selective amplification. Curves C17 and C18 show the $1/e^2$ diameter. On the other hand, curves C19 and C20 show a mesial diameter. The mesial diameter is a diameter by which the light intensity per unit area exhibits a mesial magnitude of the light intensity on the optical axis. The curves C17 and C19 show the case for the excitation beam for amplification of 1400 μm, and the curves C18 and C20 show the case for the excitation beam for amplification of 930 μm. The selectively amplified laser beam accumulates around the optical axis at a greater degree with narrower excitation beam for amplification and higher gain, as a result of which the higher-order modes are removed.

(Embodiment 3)

Figure 5:
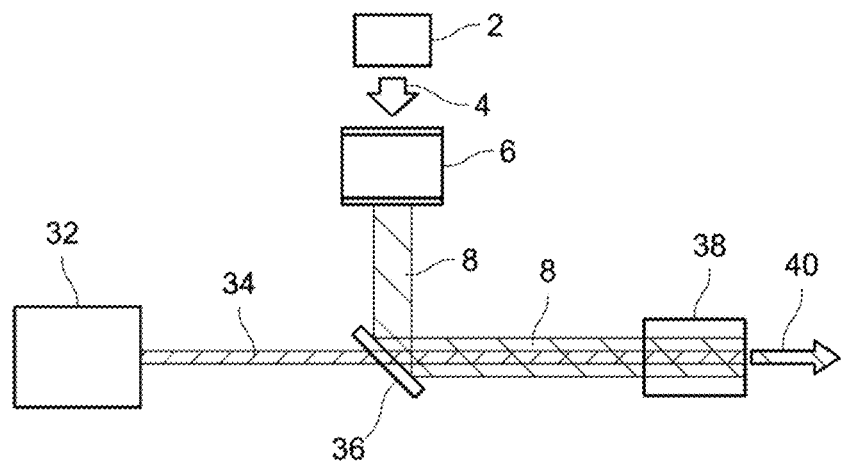
FIG. 5 explains a selective amplifier of an embodiment 3.

In an embodiment 3 shown in FIG. 5, the laser beam 8, 40 passes through an amplification gain medium 38 just once in a one-way manner. In this case, device configuration can be simplified.

Wavelengths of the excitation beam 4 for oscillation and the laser beam 8 differ from each other. An upper end face of the oscillation gain medium 6 is coated by a film that does not reflect the excitation beam 4 for oscillation but reflects the laser beam 8, and a lower end face of the oscillation gain medium 6 is coated by a film that reflects the excitation beam 4 for oscillation and a part of the laser beam 8 but allows another part of the laser beam 8 to permeate therethrough. Further, wavelengths of the excitation beam 34 for amplification and the laser beam 8 also differ from each other. The mirror 36 reflects the laser beam 8 but not the excitation beam 34 for amplification. A left end face of the amplification gain medium 38 is coated by a film that does not reflect both the laser beam 8 and the excitation beam 34 for amplification, and a right end face of the amplification gain medium 38 is coated by a film that reflects the excitation beam 34 for amplification but not the laser beam 8. The laser oscillating system provided in the oscillation gain medium 6 is designed to oscillate basically in the basic mode, however, laser beam in higher-order modes is also emitted.

The optical axis of the multi-mode laser beam 8 and the optical axis of the excitation beam 34 for amplification to be inputted to the amplification gain medium 38 match each other. The effective beam diameter of the laser beam 8 is larger than the effective beam diameter of the excitation beam 34 for amplification. Within the amplification gain medium 38, a range where the excitation beam 34 for amplification passes is excited, and is in the inverted distribution state. When the laser beam 8 is inputted under this state, induced emission is thereby generated, and light 40 with higher light intensity than the laser beam 8 is emitted. This phenomenon is generated in a range where both the excitation beam 34 for amplification and the laser beam 8 are inputted. The laser beam included in the laser beam 8 within a diameter smaller than the effective beam diameter of the excitation beam 34 for amplification is amplified by the excitation beam 34 for amplification and the amplification gain medium 38. The laser beam 40 in which a selected mode or modes are amplified is emitted from the amplification gain medium 38.

(Embodiment 4)

Figure 6:
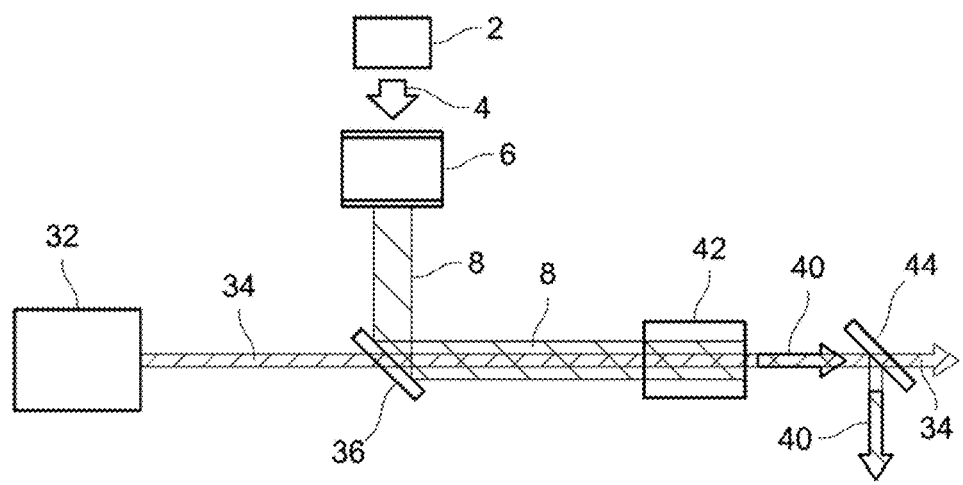
FIG. 6 explains a selective amplifier of an embodiment 4.

An embodiment 4 will be described with reference to FIG. 6. In the embodiment shown in FIG. 6, a right end face of an amplification gain medium 42 is coated by a film that does not reflect both the excitation beam 34 for amplification and the laser beam 8. Due to this, the selectively amplified laser beam 40 and the excitation beam 34 for amplification, which has once passed through the amplification gain medium 42, are emitted from the right end face of the amplification gain medium 42. Since a mirror 44 reflects the selectively amplified laser beam 40 but not the excitation beam 34 for amplification, it separates the selectively amplified laser beam 40 and the excitation beam 34 for amplification.

In comparing the embodiments 3 and 4, the excitation beam 34 for amplification reciprocates through the amplification gain medium 38 in a round trip manner in the embodiment 3, whereas in the embodiment 4, the excitation beam 34 for amplification passes through the amplification gain medium 42 just once in the one-way manner. A strong inverted distribution is developed in the amplification gain medium 38 with the former embodiment, however, the latter embodiment obtains only a weak inverted distribution. The former embodiment enables larger gain increase. Further, the former embodiment does not require the mirror 44 that separates the selectively amplified laser beam 40 and the excitation beam 34 for amplification.

(Embodiment 5)

In the embodiments 3 and 4, the laser beam 8 and the excitation beam 34 for amplification entered the amplification gain medium 38 or 42 from a same direction, however, they may enter from opposite directions.

Figure 7:
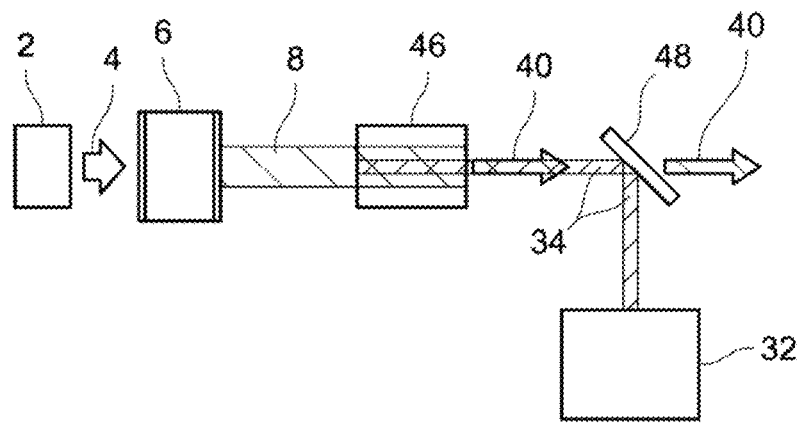
FIG. 7 explains a selective amplifier of an embodiment 5.

As shown in FIG. 7, the laser beam 8 enters an amplification gain medium 46 from a left side, and the excitation beam 34 for amplification enters the amplification gain medium 46 from a right side. Since a mirror 48 reflects the excitation beam 34 for amplification but not the selectively amplified laser beam 40, only the selectively amplified laser beam 40 is obtained on the right side of the mirror 48.

(Embodiment 6)

Figure 8:
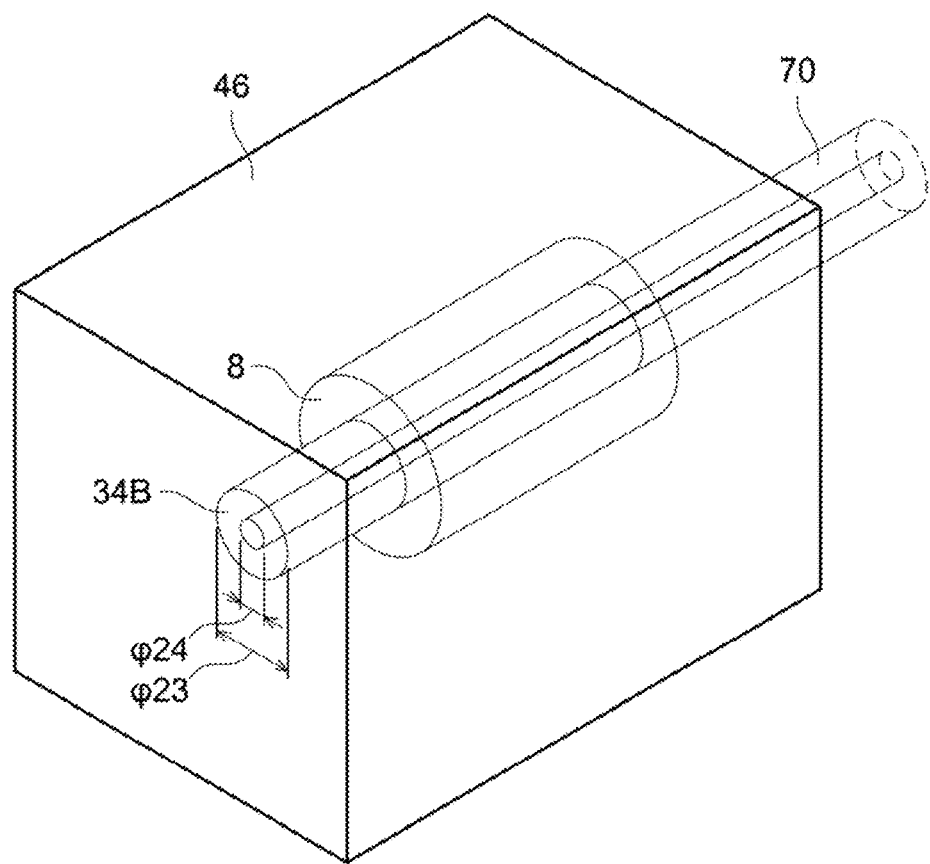
FIG. 8 explains a selective amplifier of an embodiment 6.

According to this technique, aside from cleaning to the basic mode, it may selectively amplify laser beam in a specific order range of $TEM_{nm}$ (starting from 0, with higher-order modes with greater numbers for n and m). In this case, as shown in FIG. 8, excitation beam 34B for amplification having an annular lateral cross section is used. When the excitation beam for amplification has the annular shape, laser belonging to the specific order range (for example, $TEM_{01*}$) can be selected and amplified.

(Embodiment 7)

Figure 9:
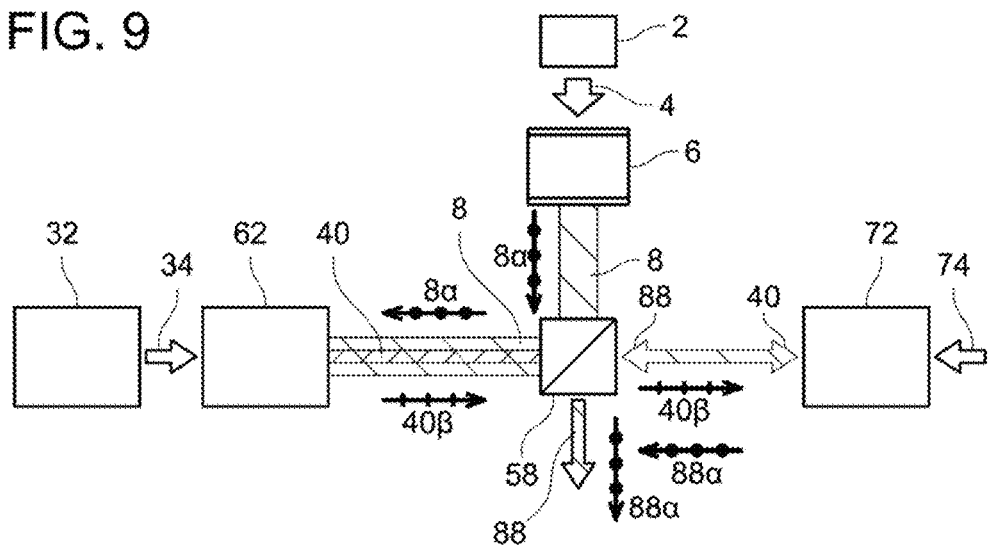
FIG. 9 explains a selective amplifier of an embodiment 7.

The selectively amplified laser beam may further be amplified. FIG. 9 shows a device that inputs the laser beam 40 that was selectively amplified by the selective amplifier of FIG. 3 or 4 to an amplifier 72, and takes out laser beam 88, which was further amplified by the amplifier 72, from the PBS 58. A reference sign 74 shows excitation beam for the amplifier 72. A right end face of the amplifier 72 is coated by a film that reflects the laser beam 40 but not the excitation beam 74, and a left end face thereof is coated by a film that does not reflect the laser beam 40 but reflects the excitation beam 74. Both the laser beam 40 and the excitation beam 74 reciprocate within the amplifier 72 in the round-trip manner.

Although not shown in FIG. 9, a λ/4 plate is arranged between the amplifier 72 and the PBS 58, and a polarization plane of laser beam progressing to the right from the PBS 58 and a polarization plane of laser beam progressing to the left toward the PBS 58 are given a relationship of being rotated by 90° with respect to each other. Due to this, only laser beam 88 that is further amplified by the amplifier 72 selectively progresses downward from the PBS 58.

Figure 10:
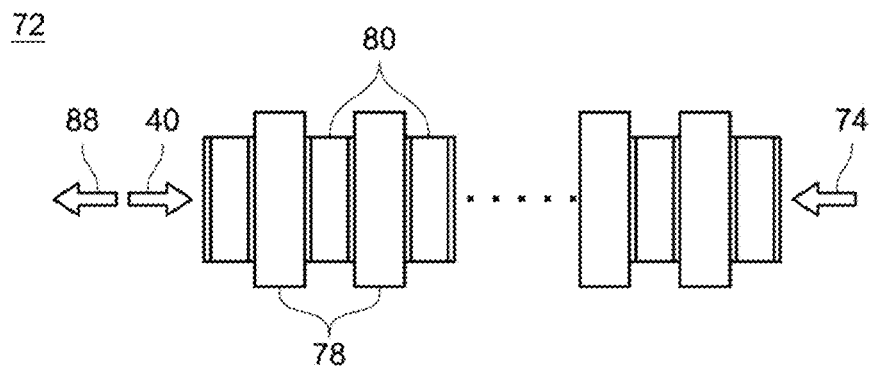
FIG. 10 explains an amplification device used in the selective amplifier of the embodiment 7.

FIG. 10 shows an example of the amplifier 72. Amplification gain medium plates 80 and transparent heat diffusing plates 78 are laminated alternately. In this amplifier 72, the laser beam 88 is generated by the induction emission phenomenon when the laser beam 40 enters therein under the state in which the inverted distribution is occurring by the input of the excitation beam 74 for amplification. The laser beam 88 has a stronger light intensity than the laser beam 40, and thus is amplified. Details of the amplifier 72 is described in the specification attached to Japanese Patent Application No. 2016-116603, the contents of which are incorporated by reference into this specification. For example, Nd:YAG may be used as the amplification gain medium plates 80, and sapphire may be used as the transparent heat diffusing plates 78. In this case, a need for a special coating at end faces of these members can be omitted. The amplification gain medium plate 80 located at each end may be exposed to air. Further, mode cleaning may further take place in the amplifier 72 by adjusting the effective beam diameters of the laser beam 40 and the excitation beam 74 for amplification.

Figure 11:
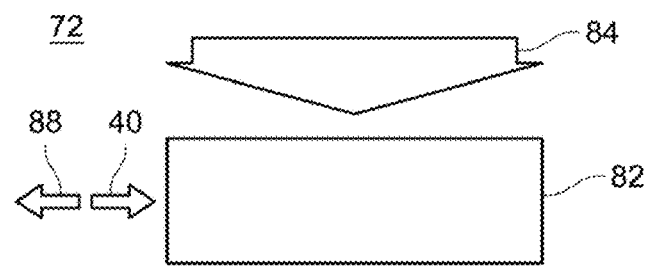
FIG. 11 explains another amplification device used in the selective amplifier of the embodiment 7.

FIG. 11 shows another example of the amplifier 72, which inputs excitation beam 84 for amplification into the amplification gain medium plate 80 from its side face. Although modes cannot be selectively amplified due to the input being performed from the side face, it amplifies the mode-cleaned laser beam 40. Thus, the amplifier of FIG. 11 may be used as the amplifier 72.

It should be noted that the invention described herein is not limited to the aforementioned embodiments, and various modifications can be made while complying with the essence of the invention, which will not be excluded from the scope of the invention.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A selective amplifier configured to amplify a laser beam of a selected part of modes included in a multi-mode laser beam, the selective amplifier comprising:
   an oscillation gain medium configured to generate the multi-mode laser beam;
   an amplification gain medium; and
   a generator configured to generate an excitation beam for amplification, the excitation beam for amplification being configured to exhibit an inverted distribution state when inputted to the amplification gain medium,
   wherein
   the multi-mode laser beam and the excitation beam for amplification are inputted to the amplification gain medium under a relationship in which an optical axis of the multi-mode laser beam and an optical axis of the excitation beam for amplification match each other, and an effective beam diameter of the excitation beam for amplification in the amplification gain medium is equal to or smaller than an effective beam diameter of the laser beam of the selected part of modes in the amplification gain medium,
   whereby laser beam in which the selected part of modes included in the multi-mode laser beam is amplified is outputted from the amplification gain medium.

2. The selective amplifier according to claim 1, wherein the oscillation gain medium and the amplification gain medium are integrated.

3. The selective amplifier according to claim 1, wherein the amplification gain medium comprises a pair of parallel end faces, and
the multi-mode laser beam is inputted to the amplification gain medium from one end face, and the excitation beam for amplification is inputted to the amplification gain medium from the other end face.

4. The selective amplifier according to claim 1, wherein the selected part of modes is a basic mode.

5. The selective amplifier according to claim 1, wherein a lateral cross-sectional shape of the excitation beam for amplification is an annular shape.

6. The selective amplifier according to claim 1, wherein the oscillation gain medium and the amplification gain medium are monocrystal or polycrystalline ceramic.

* * * * *